Figure 1:
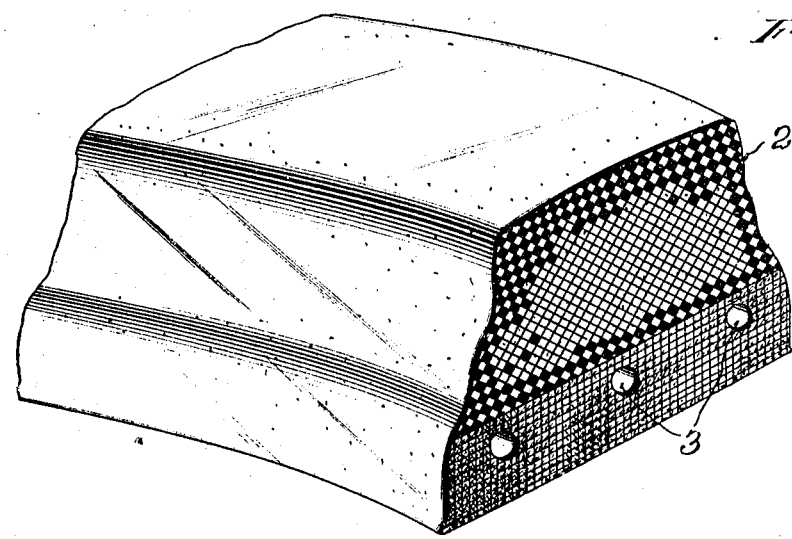

L. M. NELSON.
TIRE.
APPLICATION FILED JAN. 28, 1910.

969,717.

Patented Sept. 6, 1910.
2 SHEETS—SHEET 1.

Witnesses

Inventor
L. M. Nelson
By Frank Lacey, Attorneys.

L. M. NELSON.
TIRE.
APPLICATION FILED JAN. 28, 1910.

969,717.

Patented Sept. 6, 1910.
2 SHEETS—SHEET 2.

Witnesses

Inventor
L. M. Nelson
By _____, Attorneys.

UNITED STATES PATENT OFFICE.

LOUIS M. NELSON, OF PENNINGTON, NEW JERSEY, ASSIGNOR TO NELSON TIRE COMPANY, A CORPORATION OF WYOMING.

TIRE.

969,717.

Specification of Letters Patent. Patented Sept. 6, 1910.

Application filed January 28, 1910. Serial No. 540,588.

*To all whom it may concern:*

Be it known that I, LOUIS M. NELSON, a citizen of the United States, residing at Pennington, in the county of Mercer and State of New Jersey, have invented certain new and useful Improvements in Tires, of which the following is a specification.

This invention has for its primary object a simple, durable and efficient construction of resilient tire of the solid or cushion type, for use on the wheels of motor trucks or other vehicles, and the invention consists, essentially, in an improved tire of this type which has incorporated therewith, forming a component part of the tire structure, layers of open mesh fabric, the strands of which are preferably round and all of the same size and density, said layers being impregnated with rubber or a rubber composition and being finally cured into an integral whole, the resulting or completed structure being provided with a tread portion which is cellular so far as the rubber or rubber composition is concerned, the cellular formation being reinforced by the tensile strength of the rubber fabric.

The invention also consists in a tire of this type in which the layers of open mesh fabric have interposed between them at the base portion of the tire, some relatively narrow transversely extending strips of relatively close mesh fabric, such as cotton duck, whereby when all of the layers are compressed and the body portion of the tire cured, the completed tire will have a relatively solid base portion which will avoid liability to expand at the base, even under extreme pressure, and which will provide a relatively solid foundation in which the tie wire openings may be formed and which may be securely engaged by the rim of the wheel to which the tire is applied.

The invention further consists in a tire of this type and construction in which the strands of the open mesh fabric run diagonally and present their ends to the wearing surface of the tire, or tread, so that there will at all times be only the ends of the strands exposed, no matter how far the tire wears down, this construction not only increasing the longevity of the tire and preventing the disintegration thereof, but also producing a non-skid surface or tread.

The invention further consists in an improved method of forming a tire of this character. And the invention further consists in certain constructions and arrangements of the parts that I shall hereinafter fully describe and claim.

Figure 2:
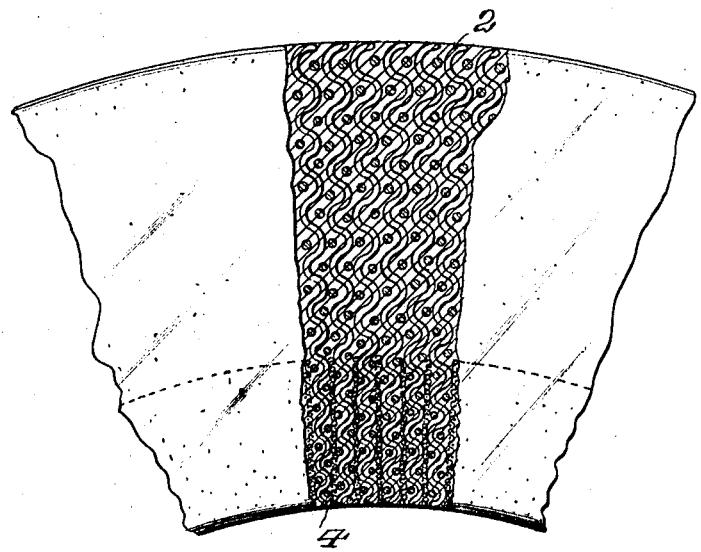
Figure 3:
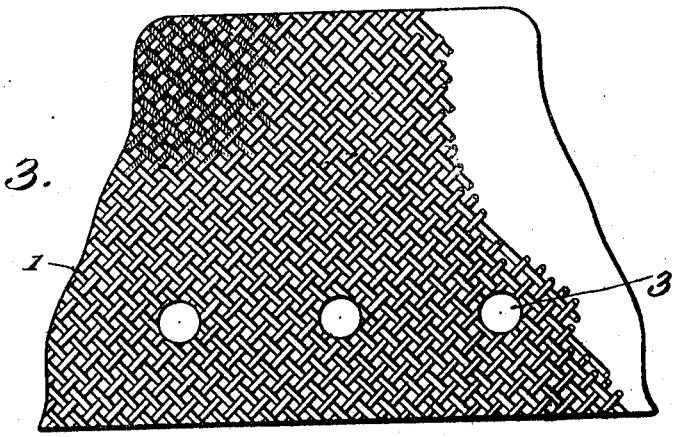
Figure 4:
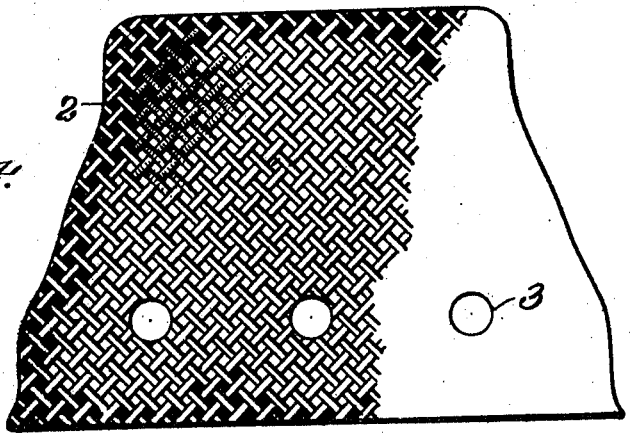
Figure 5:
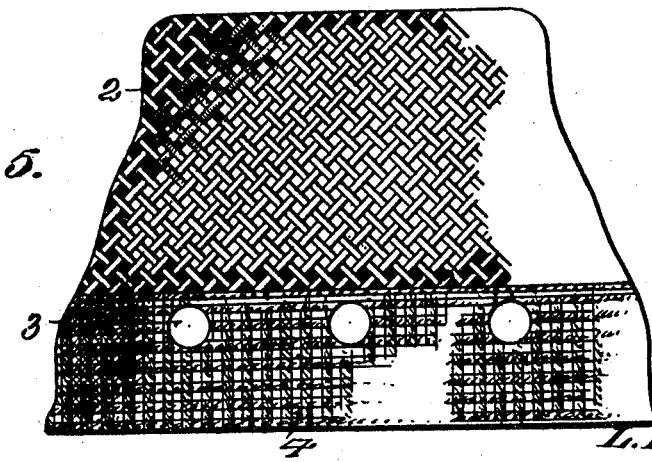

For a full understanding of the invention, reference is to be had to the following description and accompanying drawings, in which:

Figure 1 is a sectional perspective view of a portion of a tire constructed in accordance with my invention; Fig. 2 is a longitudinal sectional view thereof in the nature of a diagram; Fig. 3 is a detail view of one of the open mesh layers employed; Fig. 4 is a view of the same after it has been impregnated with the rubber or rubber composition; and, Fig. 5 is a similar view after one of the close mesh sections has been applied.

Corresponding and like parts are referred to in the following description and indicated in all the views of the drawings by the same reference characters.

In carrying out my invention, I first take a strip of fibrous open mesh textile fabric, cut on the bias from a sheet, and I form out of such strip a number of sections or layers 1, preferably of the shape illustrated in Fig. 1, for a purpose hereinafter described. It is to be particularly noted that in the preferred embodiment of the invention as herein illustrated in the drawings, the fabric out of which the layers 1 are cut or otherwise formed, is composed of preferably round strands, all of which are of equal size and density, running at right angles to each other, and that I so cut the layers that the strands will run diagonally.

In carrying out the next step in the method, I impregnate the layers 1 with rubber or a rubber composition which fills the substantially square interstices between the several strands with cushions of rubber or rubber composition, the resultant structure being in effect a cellular rubber or rubber composition layer reinforced by open mesh fabric, the strands of which run obliquely so as to impart to the cellular rubber or rubber composition formation, to the best possible advantage, the tensile strength of the textile fabric. The impregnated layers, which are designated 2 and one of which is illustrated in Fig. 4, are formed with any desired number of openings 3, near their base edges, whereby they may be strung on tie wires or rods of any desired number or construction, the same being omitted from the illustration. The impregnated layers are strung on the wires, in a suitable mold, (not shown) and are combined therein with the plastic rubber or rubber composition, and they are preferably alternated with base section 4 of some close mesh fabric, such as cotton duck, the base sections having their treads extending transversely, as clearly illustrated in the drawing, (see Fig. 5) and extending, say, only for about an inch outwardly from the base edge of the tire structure. The openings 3 are so located that they extend through the base sections 4. The two sets of layers, namely, the impregnated layers of open mesh fabric and the impregnated base sections 4, are compressed within the mold and cured, the completed structure being a continuous tire, the base portion of which is practically solid, while the tread portion, or, say, all of the body portion with the exception of the base section of approximately one inch in thickness, being resilient, as it is a rubber or rubber composition of cellular formation, reinforced by the open mesh fabric. It is to be understood that the base sections 4 are not necessarily first impregnated, but they are secured to the impregnated layers 2. It is also to be understood and particularly noted that the strands of the base sections 4 extend transversely or perpendicularly to each other and parallel with and at right-angles to the base surface of the tire, while on the other hand all of the strands of the open mesh fabric first described and forming the main or body portion of the tire in contradistinction to the base portion thereof, extend obliquely, as clearly illustrated in the drawing.

From the foregoing description in connection with the accompanying drawings, it will be seen that I have produced a tire in which the body portion, from the tread inwardly a predetermined distance, is composed of a relatively large number of small rubber cushions which lie within the interstices of the strands of the layers of open mesh fabric, this resulting in the cellular formation before mentioned, while the base of the tire is relatively solid so that it is best adapted to be formed with the openings for the tie wires or rods and is also, owing to its peculiar formation described, best adapted to withstand expansion at the base, even under extreme pressure.

Preferably, in the formation of the layers out of the strip of the open mesh textile fabric, the alternate layers are of opposite formation, whereby they will match when reversed to lie one upon the other, this not only serving to avoid waste in the cloth, but also tending to promote the production of an even homogeneous structure, as any tendency of the strands of one layer to pull in one direction laterally will be resisted by the tendency of the strands of the next layer to pull in the opposite direction.

While I have set forth my invention as being the result of a definite method of producing the tire, it is to be understood that the invention is not limited to such method, nor in any wise, except as defined within the terms of the appended claims.

In the accompanying drawings the layers of fabric are shown as only partially impregnated with the rubber or rubber composition, but it is to be understood that this showing is made merely in order to avoid the too free use of solid black. In the construction of the parts the fabric layers are completely impregnated.

Having thus described the invention, what is claimed as new is:

1. A tire, consisting of a plurality of layers of open mesh fabric, and a plurality of intervening base sections overlapping the inner end of the said layers and of less width, radially considered, than said layers, the said sections being composed of close woven fabric, the whole being impregnated with a resilient substance and vulcanized.

2. A tire, comprising a plurality of layers of open mesh fabric, the strands of which run diagonally, and a plurality of intervening relatively narrow and transversely extending strips overlapping the layers at the inner ends thereof; the sections being composed of close mesh fabric, the strands of which run respectively at right angles to and parallel with the base surface of the tire, the whole being impregnated with a yielding substance and producing a resilient body portion and a relatively solid base.

In testimony whereof I affix my signature in presence of two witnesses.

LOUIS M. NELSON. [L. S.]

Witnesses:
  J. V. GAVIGAN,
  M. V. HUNT.